US012367313B2

(12) United States Patent
Delvaux et al.

(10) Patent No.: US 12,367,313 B2
(45) Date of Patent: Jul. 22, 2025

(54) METHOD AND SYSTEM FOR ANONYMISATION OF TIME SERIES

(71) Applicant: BIG DATA SANTE, Nantes (FR)

(72) Inventors: Louis Delvaux, Pierre de Bresse (FR); Olivier Breillacq, Nantes (FR)

(73) Assignee: BIG DATA SANTE, Nantes (FR)

( * ) Notice: Subject to any disclaimer, the term of this patent is extended or adjusted under 35 U.S.C. 154(b) by 249 days.

(21) Appl. No.: 18/004,115

(22) PCT Filed: Jul. 8, 2021

(86) PCT No.: PCT/FR2021/051260
§ 371 (c)(1),
(2) Date: Jan. 3, 2023

(87) PCT Pub. No.: WO2022/008845
PCT Pub. Date: Jan. 13, 2022

(65) Prior Publication Data
US 2023/0267230 A1   Aug. 24, 2023

(30) Foreign Application Priority Data
Jul. 8, 2020   (FR) .................................... 2007245

(51) Int. Cl.
*G06F 21/62*   (2013.01)
(52) U.S. Cl.
CPC ................. *G06F 21/6254* (2013.01)
(58) Field of Classification Search
CPC ............. G06F 21/6254; G06F 21/6245; G06F 16/285; G06F 17/18; G06F 18/22;
(Continued)

(56) References Cited

U.S. PATENT DOCUMENTS

2010/0064373 A1   3/2010   Cai et al.
2015/0007341 A1   1/2015   Cai et al.
(Continued)

FOREIGN PATENT DOCUMENTS

CA   2980618 A1   9/2016

OTHER PUBLICATIONS

Vibhor Rastigi et al: "Differentially private aggregation of distributed time-series with transformation and encryption", Proceedings of the 2010 International Conference on Management of Data, SIGMOD '10, ACM Press, New York, New York, USA, Jun. 6, 2010, pp. 735-746.
(Continued)

*Primary Examiner* — Chris Parry
*Assistant Examiner* — Abderrahmen Chouat
(74) *Attorney, Agent, or Firm* — LEASON ELLIS LLP

(57) ABSTRACT

The method outputs synthetic time series as an anonymized version of time series (x1 to xE) and comprises an identification (Fb3, Fb4) of K nearest neighbors with a distance calculation law (Eq3, Eq4), and a generation (Fb5) of a first synthetic time series version ($xi^A(t)$) corresponding to a time series (xi) by a combination (Eq6) of the K nearest neighbors. In accordance with the invention, the method comprises an additional anonymization process (Fb6) aimed at temporal characteristics of the phase (Eq10), the number of measurements (n, ni, nj) and/or the measurement step (PL, $PL^A$), the process carrying out on a first synthetic time series version ($xi^A(t)$) a modification of at least one temporal characteristic from at least one temporal characteristic of the same type of one of the K nearest adjacent time series identified, which is selected by means of a predetermined selection law (Eq9).

10 Claims, 7 Drawing Sheets

(58) Field of Classification Search
CPC ... G06F 18/2148; G06F 18/214; G06N 20/00;
G06N 5/04; G06N 3/08; G06N 7/01;
G06N 3/094; G06N 3/04; G06N 5/01;
G06N 3/084; G06N 3/044; G06N 5/022;
G06N 3/045; G06N 3/006; G06N 5/02
See application file for complete search history.

(56) References Cited

U.S. PATENT DOCUMENTS

| | | | |
|---|---|---|---|
| 2019/0087720 A1* | 3/2019 | Chakraborty | G06N 3/049 |
| 2020/0012902 A1* | 1/2020 | Walters | G06F 18/23 |
| 2020/0193309 A1* | 6/2020 | Hazard | G06N 5/041 |

OTHER PUBLICATIONS

Rahman Shah Atiqur et al: "Combining Fourier and laggedk-nearest neighbor imputation for biomedical time series date", Journal of Biomedical Informatics, Academic Press, New York, New York, USA, vol. 58, Oct. 21, 2015, pp. 198-207.

Papadimitriou et al. "Time series compressibility and privacy," Proceedings of the 33rd International Conference on Very Large Data Bases, 2007, p. 459-470.

Singh "Privacy preserving burst detection of distributed time series data using linear transforms," IEEE Symposium on Computational Intelligence and Data Mining, 2007, pp. 646-653.

Hyland et al. "Real-valued (medical) time series generation with recurrent conditional gans," 2017, arXiv preprint arXiv:1706.02633.

Yahi et al. "Generative adversarial networks for electronic health records: a framework for exploring and evaluating methods for predicting drug-induced laboratory test trajectories," 2017, arXiv preprint arXiv:1712.00164.

Yoon et al. "Time-series generative adversarial networks," 2019, Advances in Neural Information Processing Systems, pp. 5509-5519.

Forestier et al. "Generating synthetic time series to augment sparse datasets," IEEE international conference on data mining (ICDM), 2017, pp. 865-870.

* cited by examiner

METHOD AND SYSTEM FOR ANONYMISATION OF TIME SERIES

CROSS-REFERENCE TO RELATED PATENT APPLICATIONS

This application is a U.S. National Stage Application under 35 U.S.C. § 371 of International Patent Application No. PCT/FR2021/051260 filed Jul. 8, 2021, which claims the benefit of priority of French Patent Application No. 2007245 filed Jul. 8, 2020, both of which are incorporated by reference in their entireties. The International Application was published on Jan. 13, 2022, as International Publication No. WO/2022/008845 A1.

The invention relates generally to the anonymization of sensitive data intended to be shared with third parties, for example, for the purposes of research, analysis or utilization thereof. More particularly, the invention relates to a method and a system for anonymizing sensitive data in the form of time series.

In general, the use, storage and sharing of personal data, known as "personal data," are governed by regulations designed to protect the privacy and identity of individuals, such as the European RGPD regulations, for "General Data Protection Regulation," and the French law known as the "loi informatique et libertés." Some data, such as those related to health, private and family matters, heritage and others, are particularly sensitive and must be subject to special precautions.

The sharing of certain types of information, for example in the form of "open data," provides many opportunities, not only for the extension of knowledge and human expertise, but also for the creation of new quality products and services.

Anonymization techniques are used to process data intended to be shared with third parties in a lawful manner, for example, by putting it online. The processing carried out aims to make it impossible to identify the persons to whom the data is linked. Once the data has been anonymized, it must no longer be possible to link it to a person and this must be done permanently. An anonymization process must be thought out taking into account the intended uses of the data.

Time series belong to an important category of data and are of particular interest, especially in the health field, for medical and pharmaceutical research. These data, as time records, generally define the evolution over time of relevant variables. For example, in the health field, these relevant variables are physiological quantities such as blood pressure, heart rate and others, recorded during hospital stays. Time series data also includes data streams generated and transmitted by connected devices, such as connected watches and others, as so-called "wearable" technology.

The main known anonymization methods proceed by removing, generalizing or replacing personal information in individual records.

The so-called "k-anonymization" method is one of the most widely used. This method seeks to make each record of a data set indistinguishable from at least k−1 other records from this data set. The so-called "L-diversity" method is an extension of the "k-anonymization" method, which provides better data protection by implying the presence of at least L sensitive attribute values in each group of k records, called a "k-group." The specificity of time series makes it difficult, if not impossible, to distinguish between the quasi-identifying and sensitive attributes of these data. The "k-anonymization" and "L-diversity" methods are therefore not directly applicable to time series. Moreover, the models based on the "k-anonymization" method do not allow for the preservation of characteristics for the time series that include a large part of the information.

In the article "Supporting pattern-preserving anonymization for time-series data," IEEE Transactions on Knowledge and Data Engineering, 2011, 25(4), pages 877-892, Shou et al. suggest a so-called "(k; P)-anonymization" model for preserving the anonymity of time series. This method addresses range and pattern matching queries in time series databases while preventing linkage attacks on published data. The "k-anonymization" is extended here to a second level called "P-anonymization." In each group formed by at a minimum of k time series with the same envelope, at least P−1 other records with the same shape are required to ensure (k; P)-anonymization. However, since this method uses "k-anonymization," it introduces a generalization of the data to satisfy the queries, which results in a loss of information. Moreover, the user can only perform queries on a database that he does not control, and to obtain new information, he must perform a new query.

In the article "Pattern-sensitive time-series anonymization and its application to energy-consumption data," Open Journal of Information Systems (OJIS), 2014, 1(1), pages 3-22, Kessler et al. propose a new so-called (n; l; k)-anonymization approach, which provides time series anonymization, assuming an attacker has access to external information about the data. Given the amount of knowledge, this method provides an upper limit on the information exposed, in addition to the degree of anonymity. This method is applied to energy consumption data and involves modification of the original data to meet the defined anonymity.

Papadimitriou et al. and Singh and Sayal, in their respective articles "Time series compressibility and privacy," Proceedings of the 33rd International Conference on Very Large Data Bases, 2007, page 459-470, and "Privacy preserving burst detection of distributed time series data using linear transforms," IEEE Symposium on Computational Intelligence and Data Mining, 2007, pages 646-653, describe perturbation-based methods. These methods introduce some noise on the Fourier transforms or wavelet transforms, in order to invalidate the original structures of the time series while reducing the risk of privacy violation.

Another method of anonymization is to generate synthetic data that retains the same useful information as the original records. In recent years, generative adversarial networks (GANs) have been shown to be effective in learning the distribution of data and generating consistent synthetic data. However, their potential use for time series anonymization has not been sufficiently verified to date.

Thus, in the article "Real-valued (medical) time series generation with recurrent conditional gans," 2017, arXiv preprint arXiv:1706.02633, Esteban et al. present a recurrent "GAN" network for real-valued multidimensional time series generation, highlighting their application to the medical domain. The sensitivity of medical data is emphasized in this article and a training based on differential privacy is proposed to obtain stricter guarantees in this field. In the article "Generative adversarial networks for electronic health records: a framework for exploring and evaluating methods for predicting drug-induced laboratory test trajectories," 2017, arXiv preprint arXiv:1712.00164, Yahi et al. also highlight the use of "GAN" networks in the medical domain to generate continuous laboratory time series. In the article "Time-series generative adversarial networks," 2019, Advances in Neural Information Processing Systems, pages 5509-5519, Yoon et al. present a new time series generation model known as "TimeGAN" that combines the versatility of the unsupervised "GAN" network approach with the control of conditional temporal dynamics offered by supervised autoregressive models.

Other methods are known that allow synthetic time series generation, but these do not address privacy concerns.

For example, in the article "Generating synthetic time series to augment sparse datasets," IEEE international conference on data mining (ICDM), 2017, pages 865-870, Forestier et al. present a data augmentation technique for time series classification purposes. Synthetic time series are produced by performing a weighted average of time series using the dynamic time warping (DTW) method.

From the document US20150007341A1, a data anonymization server implemented in a cellular telephone network in the context of providing location-based services is known. Location data from a single subscriber, in the form of a sequence of time series of "fingerprints" from the subscriber on network connection nodes, is anonymized. The use of a "k-nearest neighbors" (k-NN) method is disclosed here to determine the closest connection nodes to a connection node of interest.

Document CA2980618A1 describes, in the medical context, a system for collecting and transmitting real-time data streams to a data processing and analysis center. The data includes time series. Prior to transmission to the processing center, the data is synchronized, compressed, encrypted and can be anonymized. Anonymization is aimed at sensitive data such as the identity of professionals and patients and others. This document does not detail the anonymization method used for processing the data.

In general, the various known methods for anonymizing time series or generating synthetic time series, including those discussed above, deal with time series with the same number of measurements taken at the same regular time. The known methods do not take into account possible differences between temporal characteristics of the time records, such as the spacing of the measurement times, the spacing of the first measurement, the existence of a time lag, or phase, and the number of measurements. The inventive entity emphasizes the importance for anonymization of taking into account the aforementioned differences in temporal characteristics. Indeed, unlike tabular data, temporal characteristics can be identifying data in and of themselves. For example, in the case of a time record made during a hospital stay, it may provide information about the time a person arrived or left the hospital or the total length of stay. The readings taken by the variable of interest in the time record, as well as the fluctuation of these readings, may also be identifying.

This invention is intended to provide a method and system for anonymizing time series without the aforementioned drawbacks of the prior art. The invention allows the particular temporal characteristics that may be present in time series' datasets to be taken into account and thus provides a more efficient and complete anonymization than those provided by the known solutions of the prior art.

According to a first aspect, the invention relates to a method for anonymizing sensitive data in the form of a set of time series each representing an evolution over time of the same variable, the method providing a set of synthetic time series, called "avatars," as an anonymized version of the set of time series, the method comprising an identification, for each time series in question, of a predetermined number K of nearest adjacent time series in the set of time series by means of a predetermined distance calculation law providing distances in the frequency domain between the time series under consideration and other time series of the set of time series, and a generation, for each time series under consideration, of a first version of synthetic time series from a combination in the frequency domain of the K nearest adjacent time series identified.

In accordance with the invention, the method comprises an additional anonymization process applied to the generated set of first versions of synthetic time series and delivering the set of synthetic time series, this additional anonymization process targeting temporal characteristics of phase, number of measurements and/or measurement step of the first versions of synthetic time series, and modifying at least one temporal characteristic of a first version of the synthetic time series under consideration from at least one temporal characteristic of the same type of one of the K nearest adjacent time series identified, which is selected by means of a predetermined selection law.

The method of the invention makes it possible to process any type of time series, taking into account possible differences between the time series, namely, the time step, the number of measurements and/or the existence of a phase. The method of the invention is designed for anonymization of univariate time series, i.e., with a single time-varying variable, and multivariate time series, i.e., with several time-varying variables.

According to a particular embodiment, the method comprises a preliminary processing of the set of time series ensuring a uniformity of the measurement step temporal characteristic before the identification of the K nearest adjacent time series, this uniformity using an interpolation of at least one time series with a determined reading step.

According to another particular embodiment, the predetermined distance calculation law uses a distance calculation between frequency components in the time series, in which the distance calculation corresponds to a Euclidean distance calculation in the time domain, and/or uses a distance calculation based on the signal processing of the time series.

According to yet another particular embodiment, in the generation of the first versions of the synthetic time series, the combination of the K nearest adjacent time series identified uses a weighted sum thereof in the frequency domain comprising random weight coefficients assigned to the K nearest adjacent time series identified respectively.

According to yet another particular embodiment, the random weight coefficients are calculated from the distances, a random weight and a contribution deduced from a randomly mixed vector.

According to yet another particular embodiment, the predetermined selection law takes into account the distances and a random weight.

According to another aspect, the invention also relates to a system for anonymizing sensitive data in the form of a set of time series each representing an evolution over time of a same variable, the system providing a set of synthetic time series, called "avatars," as an anonymized version of the set of time series, the system comprising an identification module identifying, for each time series considered, a predetermined number K of nearest adjacent time series in the set of time series by means of a predetermined distance calculation law providing distances in the frequency domain between the time series in question and other time series of the set of time series, and a generation module generating, for each time series in question, a first version of synthetic time series from a combination in the frequency domain of the K nearest adjacent time series identified.

In accordance with the invention, the system comprises an additional anonymization processing module processing the generated set of first versions of synthetic time series and outputting the set of synthetic time series, said additional anonymization processing module processing temporal characteristics of phase, number of measurements and/or measurement steps of the first versions of synthetic time series, and the additional anonymization processing module carrying out on a first version of synthetic time series considered a modification of at least one temporal characteristic from at least one temporal characteristic of the same type of one of the K nearest adjacent time series identified which is selected using a predetermined selection law.

The invention also relates to a computer system having a data storage device that stores program instructions for implementing the method as briefly described above.

The invention also relates to a time series anonymization and sharing system comprising at least one computer system as mentioned above and a remote computer server connected through a data communications network, the remote computer server hosting functions for uploading and storing anonymized time series provided by the at least one computer system and functions for managing recipients and sharing the anonymized time series.

The invention also relates to a computer program product comprising a medium upon which are recorded program instructions readable by a processor for implementing the method as briefly described above.

Further advantages and particular embodiments of this invention will become clearer from the description below of several particular embodiments with reference to the appended drawings, in which:

FIG. 1 a simplified general architecture of a particular embodiment of a time series anonymization and sharing system where the time series anonymization process according to the invention is implemented.

In the following description, for purposes of explanation and not as a limitation, specific details are provided to allow an understanding of the technology described. It will be apparent to the person skilled in the art that other modes or embodiments may be practiced outside the specific details described below. In other cases, detailed descriptions of well-known methods, devices, techniques, etc., are omitted so as not to complicate the description with unnecessary detail. Generally, the term "random" as used in the present description of the invention and the appended claims should also be understood as "pseudo-random," "quasi-random" and the like, and refers to various known methods of generating so-called "random" variables.

Figure 1:
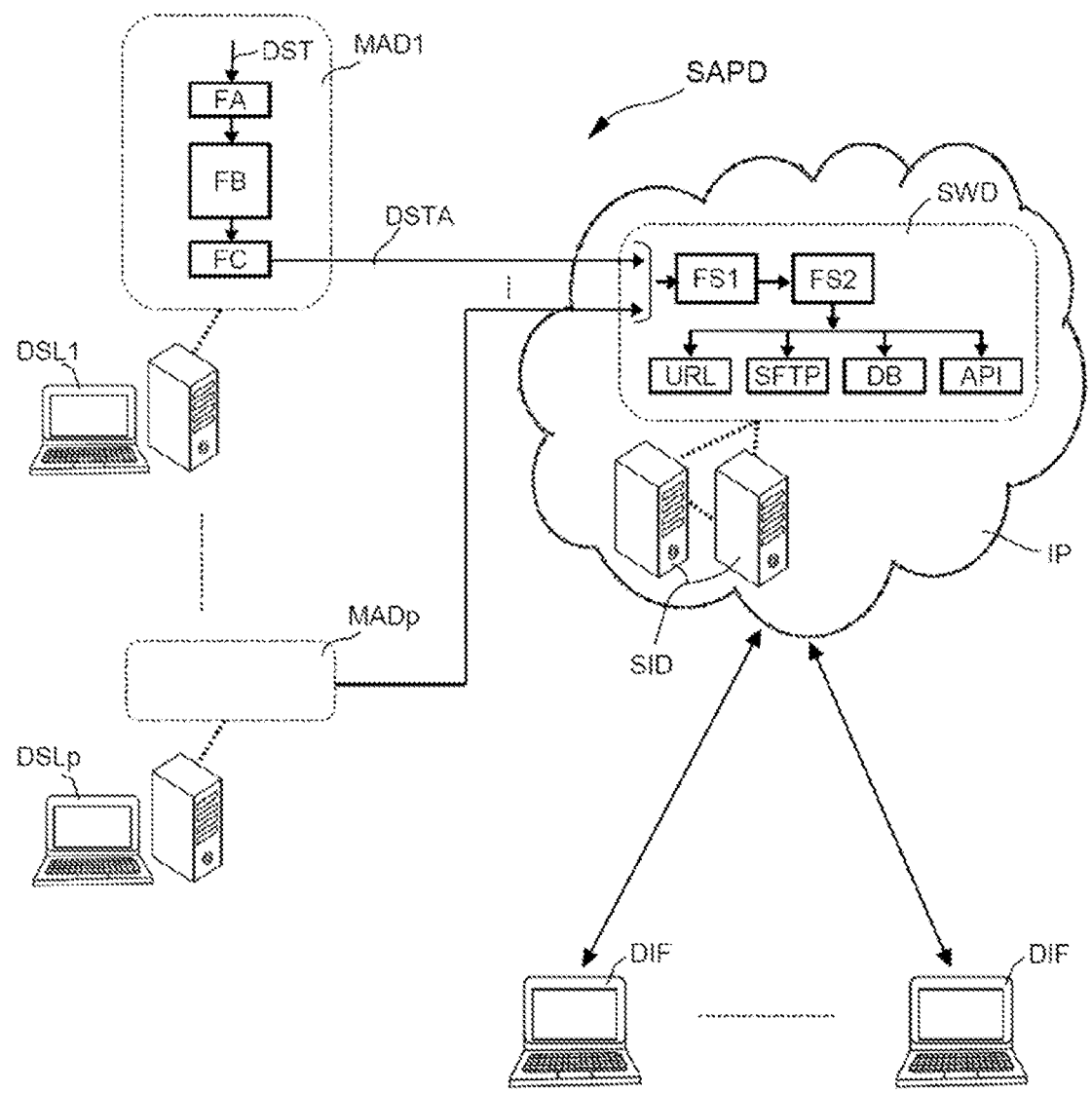

With reference to FIG. 1, it is now described below an example of a general architecture of a particular SAPD embodiment of a time series anonymization and sharing system according to the invention.

As is visible in FIG. 1, the SAPD system according to the invention is deployed via an IP wide area data communication network, such as the Internet, and here essentially comprises one or more local computer systems, DSL1 to DSLp, and at least one remote computer server SID in data communication over the IP network with the local computer systems DSL1 to DSLp.

The time series anonymization method according to the invention is implemented in each of the local computer systems DSL1 to DSLp. Thus, for example, the local computer systems DSL1 to DSLp are located at different sites, such as hospitals, which collect a large number of time series DST relating to persons followed at these sites.

Anonymization software modules MAD1 to MADp, respectively hosted on data storage devices, such as memory and/or hard disk, of the local computer systems DSL1 to DSLp, provide the anonymization processing of the DST time series. On each of the local computer systems DSL1 to DSLp, the implementation of the time series anonymization process according to the invention is ensured by the execution of code instructions of the anonymization software module by a processor (not shown) of the local computer system.

As shown in FIG. 1 for the anonymization software module MAD1, each of the anonymization software modules MAD1 to MADp performs a plurality of functions corresponding respectively to steps of the time series anonymization process according to the invention. These functions and the corresponding steps are described in detail below. Briefly, a first functional block FA ensures the reception of the collected time series DST. Another functional block FB ensures the anonymization processing of the DST data and provides anonymized time series DSTA intended to be shared. A functional block FC stores the anonymized DSTA data in a local database (not shown) and transmits it to the remote computer server SID, via the IP data communication network.

The remote computer server SID is, for example, comprised of one or more servers of a cloud computing service provider. Here, the remote computer server SID provides functions for storing and disseminating the anonymized time series DSTA. The anonymized time series DSTA are thus made accessible to a plurality of recipients. These recipients access the anonymized time series DSTA by means of computing devices DIF connected to the IP network.

The remote computer server SID hosts a software system SWD responsible for storing and disseminating the anonymized time series DSTA. As illustrated in FIG. 1, the software system SWD typically provides a function FS1 for uploading and storing the anonymized time series DSTA in the remote computer server SID and a function FS2 for managing the recipients of the anonymized time series DSTA. Thus, the anonymized time series DSTA can be made available by various means, such as by file download, for example, in the known CSV, XML or XLS format, directly from a single customized link in the form of a URL address, file browsing and download through a secure protocol, for example the SFTP protocol, a secure query on a database DB, or an API allowing a direct interface of a recipient's software application with the DSTA data. The recipients can be notified of the availability of the DSTA data by a hybrid authentication system comprising at least two steps, based in particular on the generation and transmission of a unique download link, for example by email, and then the communication of a time-limited key, for example by SMS.

The time series anonymization method according to the invention is now described below with reference to FIGS. 2 to 7. Generally speaking, the method of anonymizing time series of the invention is based on local modeling and includes in particular an identification of the K nearest similar time series, a construction of local models and a random generation of synthesis time series, referred to as "avatars," corresponding to the time series to be anonymized.

FIGS. 2 to 6 illustrate an example of anonymization of a set of time series, $x_1$ to $x_E$, formed here of E=20 time records.

Figure 2:
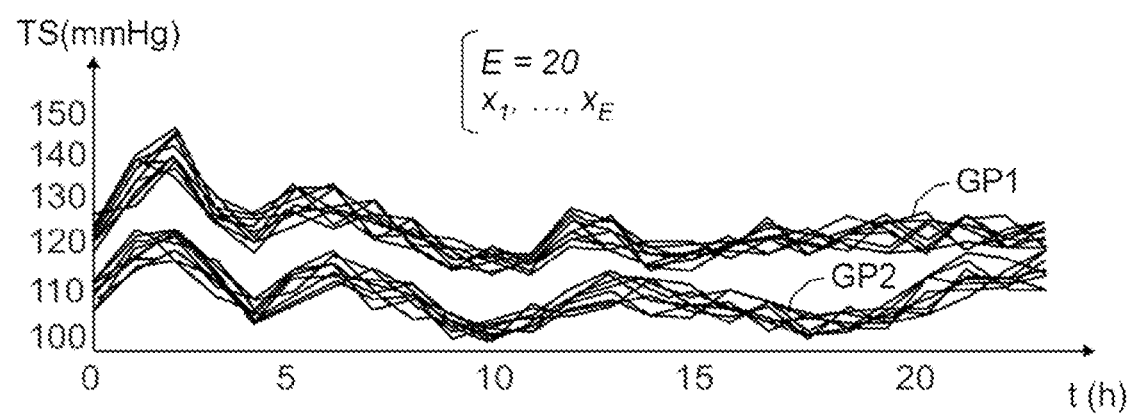
FIG. 2 represents in the form of curves an example of a set of time records of systolic blood pressure records to be anonymized.

With reference to FIG. 2, the E=20 time records $x_1$ to $x_E$, shown in FIG. 2 as curves, are recordings of the systolic blood pressure SBP of two groups of patients GP1 and GP2.

Figure 3:
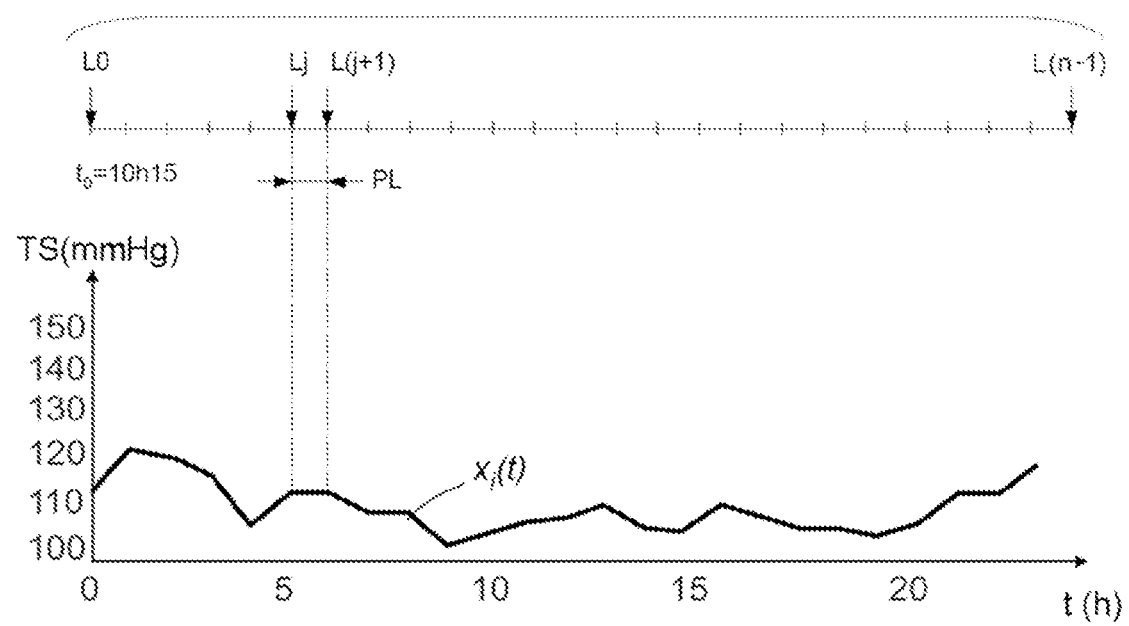
FIG. 3 represents the curve of a time record considered to be anonymized from the set of time records in FIG. 2.

FIG. 3 shows any recording, referred to as $x_i$, that is part of the set of time records $x_1$ through $x_E$. The evolution of systolic pressure SBP, in millimeters of mercury (mmHg), is plotted against time t, in hours (h). As is visible in FIG. 3, the time record $x_i$ consists of n measurements L0 to L(n−1) of systolic blood pressure that are made in a routine manner, with a regular time step PL between two successive measurements, Lj and L(j+1). The first measurement, L0, is in this example taken at an hourly time $t_0$, which here is 10:15. In the usual cases, the different time records of a data set to be anonymized have the same time step PL. However, in other cases, the time step PL is not evenly spaced or differs from one record to another. The hourly times to of the start of the time records and the numbers of measurements n usually differ and depend on the dates and lengths of stay of the patients in the hospital.

As will become clearer later on, the time series anonymization method according to the invention is designed to take into account the different cases that may arise, and thus allows for the anonymization of all types of time series.

The above-mentioned temporal characteristics, i.e. the time step, the number of measurements and the time of first measurement, are not dealt with in this example, as the E=20 time records have the same temporal characteristics.

Figure 4:
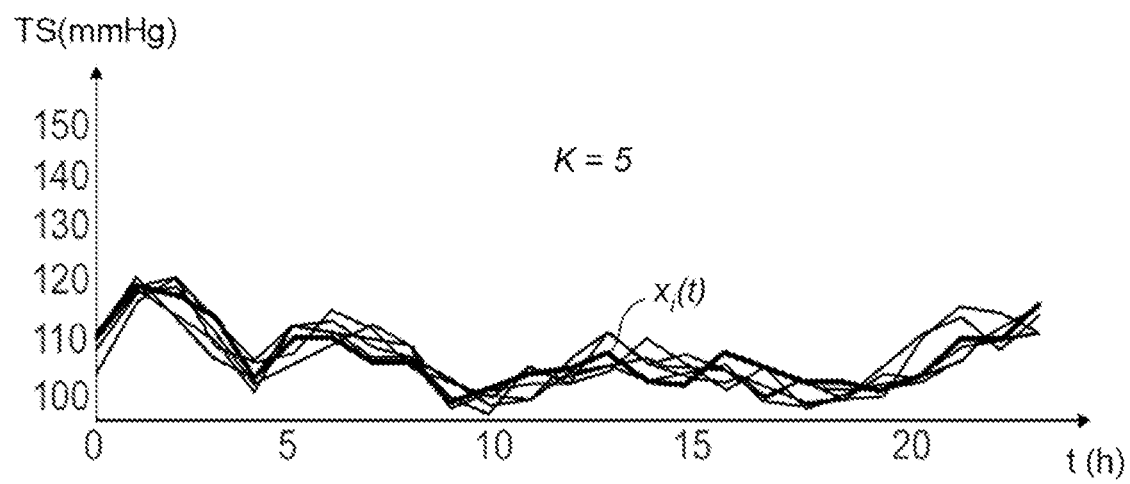
FIG. 4 represents the K nearest time records from the time record considered shown in FIG. 3.
Figure 5:
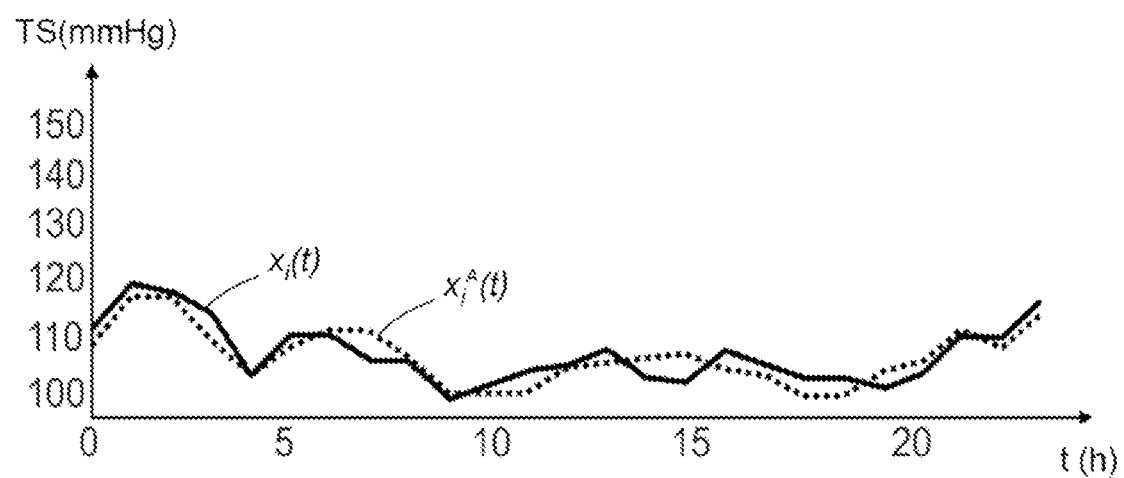
FIG. 5 represents the relevant time record of FIG. 3 and a corresponding synthetic avatar that is generated from the K nearest time records shown in FIG. 4.
Figure 6:
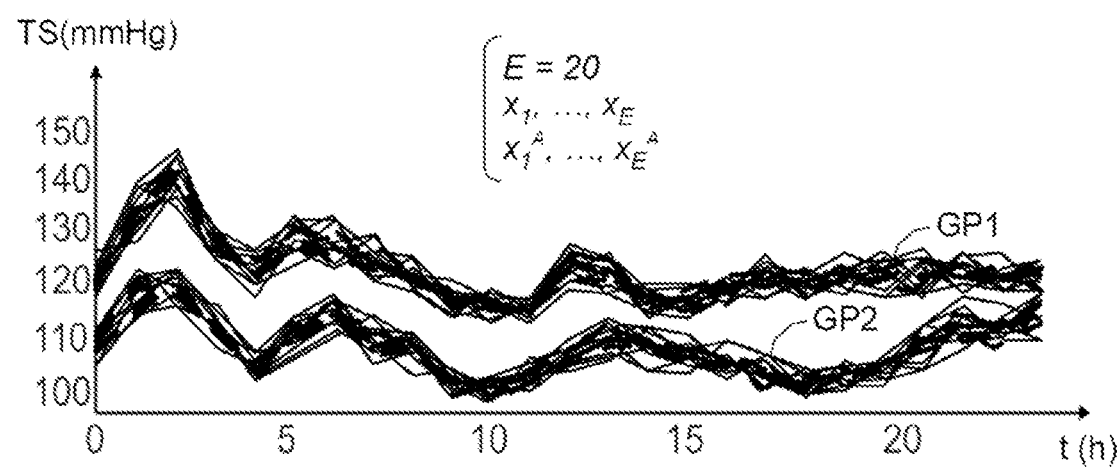
FIG. 6 represents the set of systolic blood pressure time records of FIG. 2 and a set of corresponding synthetic avatars obtained by implementing the time series anonymization process according to the invention.

FIG. 4 shows K=5 nearest neighbor records of the considered record $x_i$ that have been identified in the set of time records $x_1$ to $x_E$. FIG. 5 shows an avatar $x_i^A$ computed for the considered record $x_i$, based on the transformations of the K=5 nearest neighbor records of the considered record $x_i$. The process of identifying the K=5 nearest neighbor records and computing the avatar is repeated for each of the time records $x_1$ to $x_E$ and results in a set of E=20 avatars. FIG. 6 shows the E=20 time records $x_1$ to $x_E$ of the patient groups GP1 and GP2 and the avatars $x_1^A$ to $x_E^A$ obtained by implementing the process according to the invention.

Figure 7:
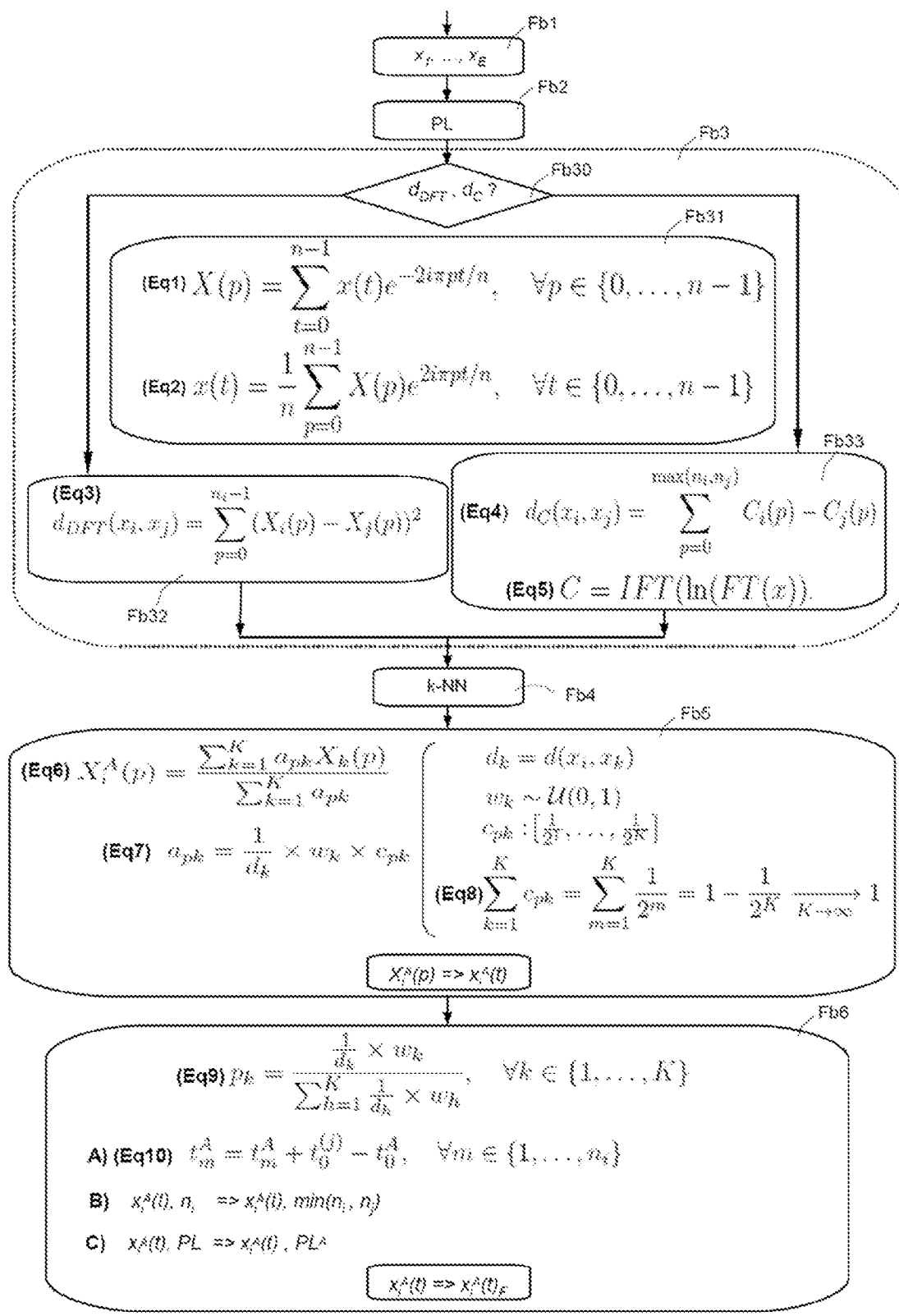
FIG. 7 shows in the form of a logigram the anonymization treatment process implemented in a particular embodiment of the time series anonymization process according to the invention.

The anonymization process carried out in accordance with the method according to the invention is now described in detail below with particular reference to FIG. 7. Various functions, marked Fb1 to Fb6 in FIG. 7, are executed by the anonymization processing method for implementing the method according to the invention. These various functions Fb1 to Fb6 are included in the aforementioned functional block FB, with reference to FIG. 1.

The function Fb1 performs a grouping of E time series to form a set of time series $x_1$ to $x_E$, in order to process them for anonymization. In this particular embodiment of the method according to the invention, univariate time series of the same nature, i.e. concerning a single variable, such as the systolic blood pressure in the example of FIGS. 2 to 6, are grouped together to form the set of time series $x_1$ to $x_E$ to be anonymized.

The function Fb2 is a pre-processing of temporal characteristics of the time series $x_1$ to $x_E$, more precisely, the time step. The function Fb2 typically performs linear interpolations in the time series $x_1$ to $x_E$, with the same time step PL, to obtain a set of uniformly spaced time series. The time step PL is a parameter that is chosen by the user. The time step PL chosen will generally be the one that allows us to store the relevant information from the initial time series. Linear interpolation has the advantage of a relatively simple calculation and avoids interpolation errors that are too large in the case of a large number of measurements. However, it should be noted that another type of interpolation may be used in other methods of implementation of the process according to the invention.

At the end of the processing carried out by the function Fb2, all the time series $x_1$ to $x_E$ are uniformly spaced using the same time step PL. In the further processing until the execution of function Fb5, it is considered that the first measurement L0 of each time series corresponds to time $t_0$="0" and that the time interval between two successive measurements is one time unit, which provides: $t_0=0$, $t_1=1$, $t_2=2$, ..., etc.

The function Fb3 concerns the distance computation law used as a similarity measure between uniformly spaced time series, in order to determine the K nearest adjacent time series for each of the time series of the set of time series to be anonymized. Two distances, based on the Fourier transformation, have been identified by the inventive entity as providing good results for a similarity measure between two time series that do not have the same number of measurements.

The Fourier transform allows for a representation in the frequency domain of a signal varying in time. The discrete Fourier transform X(p) of a uniformly spaced time series x(t) is provided by the equality Eq1 shown in block Fb31 in FIG. 7. The inverse Fourier transform is provided by the equality Eq2 shown in block Fb31 in FIG. 7.

The first usable distance, referred to as $d_{DFT}(x_i, x_j)$ between two considered time series $x_i(t)$ and $x_j(t)$ is computed using the equality Eq3 shown in block Fb32 in FIG. 7, from the Fourier transforms $X_i(p)$ and $X_j(p)$ from these two time series $x_i(t)$ and $x_j(t)$.

For time series $x_i(t)$ and $x_j(t)$ with the same number of measurements, $n_i=n_j$, this distance $d_{DFT}(x_i, x_j)$ corresponds to the Euclidean distance in the time domain. However, if the time series do not have the same number of measurements, a linear interpolation of the Fourier coefficients of one time series is performed at the same frequencies as the Fourier coefficients of the other time series. The method is local. The time series concerned keeps its Fourier coefficients intact and the interpolation is performed on the other time series.

The second usable distance, referred to as $d_C(x_i, x_j)$ between two time series under consideration $x_i(t)$ and $x_j(t)$ is calculated with the equality Eq4 shown in block Fb33 in FIG. 7, from the cepstrals $C_i$ and $C_j$ of these two time series $x_i(t)$ and $x_j(t)$. The cepstral C of a time series x is a transformation of the time series x from its time domain to another analogous time domain. The cepstral C of the time series x is defined as the inverse Fourier transform IFT of the logarithm ln of the Fourier transform FT of the time series x. The cepstral C is calculated with the equality Eq5 shown in block Fb33 in FIG. 7.

For time series $x_i(t)$ and $x_j(t)$ not having the same number of measurements, zeros are added to the end of the cepstral, $C_i(p)$ or $C_j(p)$, having the least number of measurements. The number of zeros added is equal to: $\max(n_i, n_j)-\min(n_i, n_j)$, with the max and min functions providing the number of measurements in the longest time series and the number of measurements in the shortest time series, respectively.

The distance $d_{DFT}$, unlike the cepstral distance $d_C$, takes into account the differences in amplitude scale and offset of the values. Two time series with the same pattern at different amplitudes will be considered similar with the cepstral distance.

The choice of the distance used, $d_{DFT}$ or $d_C$, will depend on the application and will be made in order to get as close as possible to the notion of similarity in the concerned application. This choice is represented in FIG. 7 by the conditional block Fb30. It should be noted that some applications may use both distances, $d_{DFT}$ and $d_C$, for their distance calculation law.

The function Fb4 concerns the construction of a local model for each time series of the set of time series to be anonymized. The k-NN method (from "k-nearest neighbors" in English) is used to identify the K nearest adjacent time series for each of the time series. Each time series is then associated with a local model made of its K nearest adjacent time series. The distance, $d_{DFT}$ or $d_C$, chosen by the user is the one used for this identification of the K nearest adjacent time series.

The choice of the parameter K is made by the user and determines both the risk of re-identification and the conservation of the information by the avatars. Indeed, as the value of the parameter K increases, each local model is based on nearest adjacent time series that are less and less similar to the time series under consideration. The avatar obtained for a time series is more distinct from it, which reduces the risk of re-identification. On the other hand, the avatar's retention of information is less.

The function Fb5 concerns the process of generating avatars for time series, from local models formed from the K nearest adjacent time series. For each time series, the K nearest adjacent time series identified by the previous function Fb4 are used to create an avatar by computing a random weighted average of their Fourier transforms. The time series under consideration is at no time used directly in the process of generating its avatar.

The frequency-domain avatar, referred to as $X_i^A(p)$, for the time series $x_i$ is computed using the equality Eq6 shown in FIG. 7, from the Fourier transforms $X_{k(k=1,\ldots,K)}$ of the K nearest adjacent time series, referred to as $xk(k=1,\ldots,K)$, of the time series $x_i$, the Fourier transforms $X_{k(k=1,\ldots,K)}$ being interpolated at the frequencies of the Fourier $x_i$ coefficients.

In equality Eq6, the random weighting is introduced by coefficients $a_{pk}$ which are provided by equality Eq7 shown in FIG. 7. The coefficient $a_{pk}$ is the random weight assigned to the k-th nearest adjacent time series, denoted by $x_k$, for the time series $x_i$.

In Eq7, $d_k$ is the distance between $x_i$ and its nearest adjacent time series $x_k$, $w_k$ is a random weight between zero and one, following a uniform distribution, and $C_{pk}$ is a contribution that corresponds to the value at index k of the randomly mixed vector $(\frac{1}{2}^1, \ldots, \frac{1}{2}^K)$.

The contribution $C_{pk}$ can be global or local and is left to the user's choice. In both cases, the sum of all contributions $C_{pk}$ for a fixed index p is, in this example, provided by the equality Eq8 shown in FIG. 7.

The contribution $C_{pk}$ is global when the same value is assigned to all Fourier coefficients of a nearest adjacent time series. For a nearest adjacent time series, a global contribution provides the same importance to all its Fourier coefficients and thus allows for better preservation of information.

The contribution $C_{pk}$ is local when the values attributed to the Fourier coefficients of a nearest adjacent time series vary from one Fourier coefficient to another. For a nearest adjacent time series, a local contribution provides a lot of significance to some of its Fourier coefficients and little significance to others. This allows for better protection against re-identification.

Once the avatar $X_i^A(p)$ is obtained in the frequency domain, an inverse Fourier transform is applied to obtain a first version of avatar $x_i^A(t)$ in the time domain. This first obtained avatar version $x_i^A(t)$ has the same temporal characteristics as the time series from which it was created, with the number of measurements and the time of the first measurement remaining identical.

Function Fb6 relates to a further anonymization process that deals with the temporal characteristics of the first obtained avatar version $x_i^A(t)$, namely, the time of the first measurement, the number of measurements and the time step, to produce a deliverable avatar $x_i^A(t)_F$ that is the one provided by the time series anonymization process according to the invention for the time series $x_i(t)$.

In this function Fb6, the first avatar version $x_i^A(t)$ is first considered to have the same times $t_0^A, t_1^A, \ldots, t_{ni}^A$ as the $t_0, t_1, \ldots, t_{ni}$ of the time series from which it was created, i.e.: $t_0^A = t0, t_1^{At} = t_1, \ldots, t_{ni}^A = t_{ni}$.

The additional anonymization process of the function Fb6 uses a selection law, represented by the equality Eq9 shown in FIG. 7, which delivers probabilities pk. Each nearest adjacent time series of index k to the considered time series of index i is assigned a probability pk computed with equality Eq9. In equality Eq9, the distance $d_k$ ($d_h$) and the random weight $w_k$ ($w_h$) are as defined above in relation to equality Eq7.

Regarding the time of the first measurement which is identifying, the additional anonymization process provides the following processing A). For each first avatar version $x_i^A(t)$, a phase is created from the first measurement times of the nearest adjacent time series. A nearest adjacent time series with probability defined by (pk)k=1, . . . , K, is selected, randomly. Considering that it is the nearest adjacent time series of index j that is selected, the phase defined by the equality Eq10 shown in FIG. 7 is applied to the first avatar version $x_i^A(t)$. This processing fixes the phase in the deliverable avatar $x_i^A(t)_F$.

Regarding the number n of measurements, which is related to the length of stay and is identifying, the additional anonymization process provides processing C) below. As in the processing phase shown above, a nearest adjacent time series with probability (pk)k=1, . . . , K, is selected, randomly. Considering that it is the nearest adjacent time series of index j that is selected, the number of retained measurements for the first avatar version $x_i^A(t)$ is provided by the function $\min(n_i, n_j)$. Thus, if $n_j < n_i$, the last $n_i - n_j$ measures are not retained, and if $n_j >= n_i$, all measures are retained. This processing allows to fix the number n of measurements in the deliverable avatar $x_i^A(t)_F$.

Regarding the time step PL (see FIG. 3), the additional anonymization process provides the following processing C). If the PL time step of the time series has been preprocessed for uniformity by the Fb2 function, a new time step $PL^A$ is randomly selected for the first avatar version $x_i^A(t)$. The time step $PL^A$ is taken equal to that of the nearest adjacent time series with probability (pk)k=1, . . . , K. A linear interpolation of the measurements of the first avatar version $x_i^A(t)$ is then performed with this new time step $PL^A$. This processing fixes the time step in the deliverable avatar $x_i^A(t)_F$.

It should be noted that the process according to the invention guarantees preservation of the data type. Thus, for example, in the case of integer-valued time series, when using the process according to the invention leads to non-integer values for the avatars, each avatar value will be rounded to the nearest integer.

It should also be noted that the method according to the invention is applicable in the case of multivariate time series, where several variables evolve over the same period. In such a case, the distance between two multivariate time series is obtained by summing the distances between each variable. The nearest adjacent time series are therefore the most similar time series taking into account all variables. Once the nearest adjacent time series have been identified, the avatars are calculated separately for each of the variables, as in the case of univariate time series.

Of course, the invention is not limited to the example embodiments described herein for illustrative purposes. The person skilled in the art, according to the applications of the invention, will be able to make various modifications and variants falling within the scope of protection of the invention.

The invention claimed is:

1. A method for anonymizing sensitive data implemented by a computer, said sensitive data being time records including a set of time series ($X_1$ to $X_E$) and each time record representing an evolution over time of a variable (TS), said set of time series ($X_1$ to $X_E$) comprising at least three time series, said method comprising:
   identifying, in said set of time series ($x_1$ to $X_E$) and for each said time series ($x_i$) under consideration, a predetermined number K of adjacent time series that are nearest of said time series (xi) using a predetermined distance computation law determining distances ($d_{pFT}$, $d_c$) in a frequency domain between said time series ($x_i$) under consideration and other time series ($x_j$) of said set of time series ($X_1$ to $X_E$);
   generating, for each said time series (xi) under consideration, a set of first versions of a synthetic time series from a combination of said identified K adjacent time series in the frequency domain;
   performing an anonymization process on the generated set of first versions of the synthetic time series to generate an anonymized set ($x_j^A(t)_F$) of the sensitive data including the set of time series ($X_1$ to $X_E$), said anonymization process targeting temporal characteristics of phase (to), a number of measurements (n, $n_i$, $n_j$), or measurement steps (PL, $PL^A$) of said set of first versions of synthetic time series, and said anonymization process performing, on the considered set of first versions of the synthetic time series, a modification of at least one of said temporal characteristics of a same type of one of said identified K adjacent time series which is selected using a predetermined selection law;
   outputting said anonymized set ($x_i^A(t)_F$) of the sensitive data, including the set of time series ($X_1$ to $X_E$), to a computing device; and
   storing said anonymized set ($x_i^A(t)_F$) of the sensitive data, including the set of time series ($X_1$ to $X_E$), in a database of the computing device.

2. The method according to claim 1, further comprising:
   a preliminary processing of said set of time series ($x_1$ to $X_E$) ensuring a standardization of said measurement step temporal characteristic (PL) before said identifying of the K adjacent time series, said standardization using an interpolation of at least one said time series with a determined reading step.

3. The method according to claim 1, wherein said predetermined distance calculation law uses a distance calculation ($d_{DFT}$) between frequency components of said time series, said distance calculation (dpFT) corresponding to a Euclidean distance calculation in the time domain, or uses a distance calculation ($d_C$) based on the cepstrals (C) of said time series.

4. The method according to claim 1, wherein in said generating of said first versions of synthetic time series, the combination of said identified K adjacent time series uses a weighted sum thereof in the frequency domain comprising random weight coefficients ($a_{pk}$) assigned respectively to said identified K adjacent time series.

5. The method according to claim 4, wherein said random weight coefficients ($a_{pk}$) are calculated from said distances ($d_k(X_i, X_k)$), a random weight ($w_k$) and a contribution ($C_{pk}$) deduced from a randomly mixed vector ($\frac{1}{2}^1, \ldots, \frac{1}{2}^K$).

6. Method The method according to claim 1, wherein said predetermined selection law uses said distances ($d_k$, $d_h$) and a random weight ($W_k$, $W_h$).

7. A system for anonymizing sensitive data by a computer, said sensitive data being time records including a set of time series ($X_1$ to $X_E$) and each representing an evolution over time of a same variable (TS), said set of time series ($X_1$ to $X_E$) comprising at least three time series, said system comprising:
   a computing device including a database;
   a hardware-based processor;
   a memory configured to store instructions and configured to provide the instructions to the hardware-based processor;
   a set of modules executed by the hardware-based processor to implement the instructions provided to the hardware-based processor, the set of modules including:
      an identification module identifying, in said set of time series ($X_1$ to $X_E$) and for each said time series ($x_i$) under consideration, a predetermined number K of adjacent time series that are nearest of said time series ($x_i$) using a predetermined distance computation law determining distances ($d_{DFT}$, $d_c$) in a frequency domain between said time series ($x_i$) under consideration and other time series ($X_j$) of said set of time series ($x_1$ to $X_E$);
      a generation module generating, for each said time series under consideration ($x_i$), a set of first versions of a synthetic time series from a combination in the frequency domain of said identified K adjacent time series; and
      an anonymization module performing an anonymization process on the generated set of first versions of the synthetic time series to generate an anonymized set ($x_i^A(t)_F$) of the sensitive data including the set of time series ($x_1$ to $X_E$), said anonymization process targeting temporal characteristics of phase ($t_0$), a number of measurements (n, $n_i$, $n_j$), or measurement steps (PL, $PL^A$) of said set of first versions of synthetic time series, and said anonymization process performing, on the considered set of first versions of the synthetic time series, a modification of at least one of said temporal characteristics of a same type of one of said identified K adjacent time series which is selected using a predetermined selection law; and
   means for outputting said anonymized set ($x_i^A(t)_F$) of the sensitive data, including the set of time series ($x_1$ to $X_E$), to the computing device;
   wherein the database of the computing device stores said anonymized set ($x_i^A(t)_F$) of the sensitive data including the set of time series ($x_1$ to $X_E$).

8. A computer system (DSL1 to DSLp) for computer anonymization processing of sensitive data, said computer system comprising:
   a data storage device storing program instructions (MAD1 to MADp, FB) for implementing the method according to claim 1.

9. A system for computer-based anonymization processing and sharing of sensitive data (DST), said system comprising:
   at least one computer system (DSL1 to DSLp) according to claim 8 and a remote computer server (SID) connected through a data communication network (IP), said remote computer server (SID) hosting functions (SWD, FS1, DB) for uploading and storing anonymized time records (DSTA) provided by said at least one computer system (DSL1 to DSLp) and functions (SWD, FS2, URL, SFTP, DB, API) for managing recipients and sharing said anonymized time records (DSTA).

10. A computer program product comprising a non-transitory medium in which program instructions (MAD1 to MADp, FB) readable by a processor are recorded for the implementation of the method according to claim 1.

\* \* \* \* \*